United States Patent Office 3,380,729
Patented Apr. 30, 1968

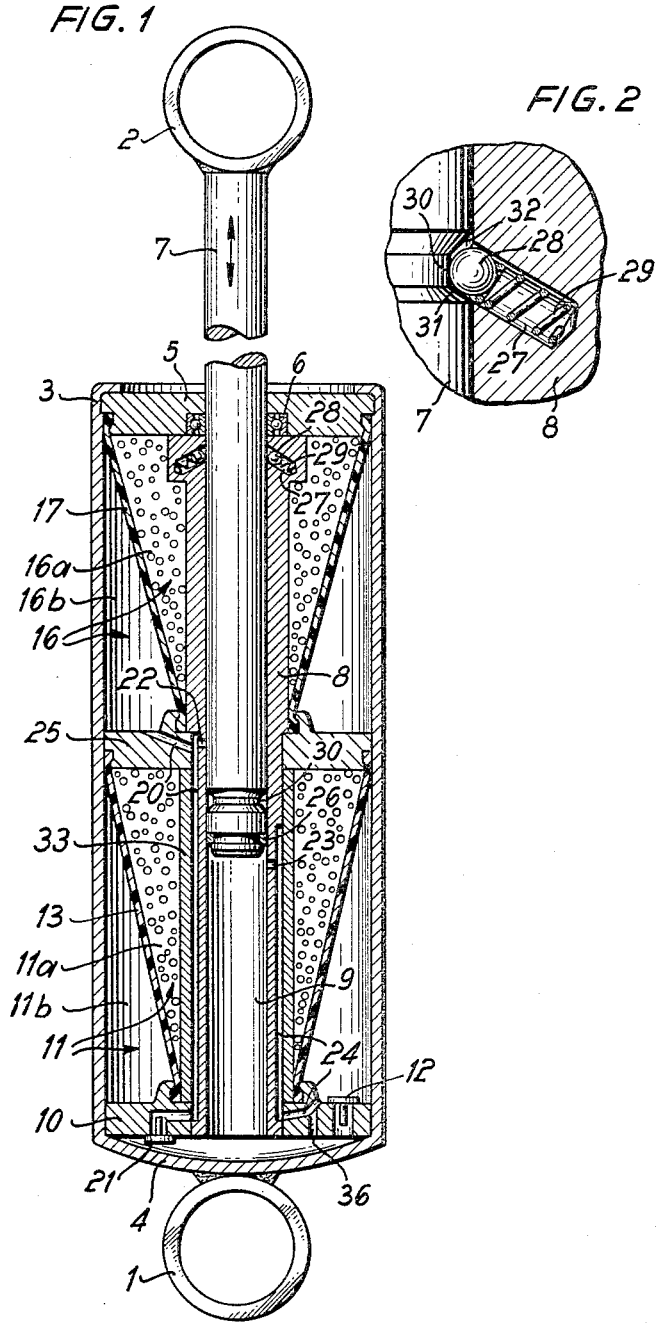

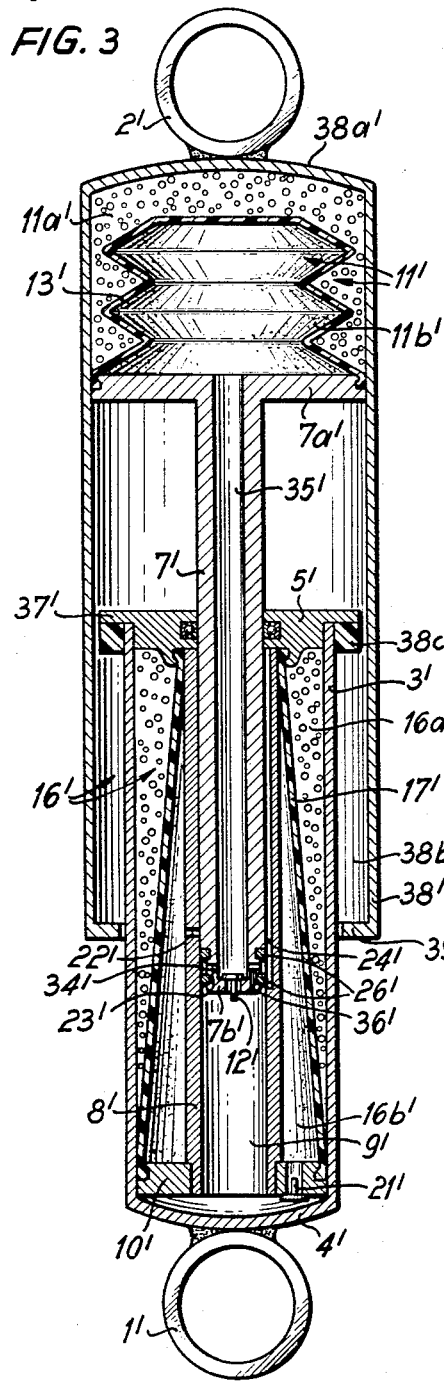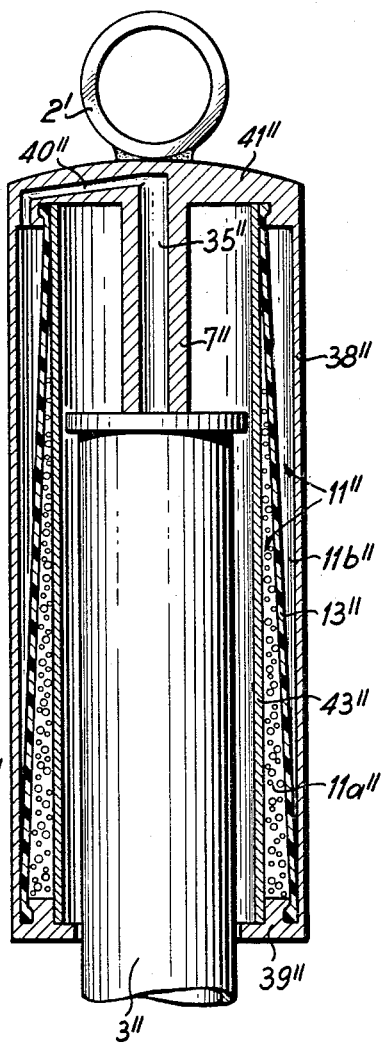

3,380,729
HYDROPNEUMATIC APPARATUS
Hans-Jürgen Hoffmann, Hohenlimburg, and Manfred Löhr, Letmathe, Germany, assignors to Hoesch Aktiengesellschaft, Dortmund, Germany
Filed Apr. 11, 1966, Ser. No. 541,599
Claims priority, application Germany, Apr. 13, 1965, H 55,780
20 Claims. (Cl. 267—64)

The present invention relates to a hydropneumatic apparatus which may be utilized as a shock absorber or strut for automotive vehicles, or as a pumping device for automatically regulating the distance between two relatively movable members, such as the wheel axle and the chassis of an automobile.

It is already known to provide a shock absorber with working and storage chambers which contain a supply of fluid including a liquid fraction and a gaseous fraction. The gaseous fraction acts not unlike a cushion and subjects the liquid fraction to a variable pressure whose magnitude depends on the amount of liquid in the respective chamber. The shock absorber also comprises a system of valves and channels which control the flow of fluid between such chambers to thereby effect a desirable shock absorbing or cushioning action. A serious drawback of certain presently known hydropneumatic shock absorbers is that they must be equipped with special pumping devices which occupy much room, which add considerably to initial cost, and whose operation is rather slow so that it takes considerable time to move a certain amount of liquid from the storage chamber into the working chamber or vice versa. Certain other types of known shock absorbers can displace relatively large quantities of liquid but require large liquid reservoirs so that they are much too bulky for use in automotive vehicles. Also, many conventional shock absorbers are too long and their pumping devices operate continuously, even when the two relatively movable parts are already caused to assume positions at an optimum distance from each other.

Accordingly, it is an important object of the present invention to provide a very simple, compact, inexpensive and rugged hydropneumatic apparatus which can be used as a shock absorber for automotive vehicles or simply as a means for automatically returning two relatively movable parts to positions at a desired distance from each other.

Another object of the invention is to provide a novel cylinder which may be utilized in an apparatus of the just outlined characteristics.

A further object of the invention is to provide a hydropneumatic strut which can take up considerable dynamic stresses and whose pumping and cushioning action may be selected and maintained with a desired degree of precision.

Still another object of the invention is to provide an olepneumatic shock absorber for automotive vehicles or the like whose spring action depends on the load and on the extent of relative displacement between the parts to which the components of the shock absorber are coupled in actual use.

Another object of the invention is to provide an exceptionally short shock absorber for automotive vehicles.

Briefly stated, one feature of the present invention resides in the provision of an apparatus which may be utilized as a shock absorber in an automotive vehicle. The apparatus comprises a cylinder and a plunger each of which is connectable to one of two members which are movable toward and away from each other (for example, to the chassis and to the wheel axle of an automobile). The cylinder has a cylinder chamber and the plunger is reciprocable in the cylinder chamber to change its effective volume. The apparatus further comprises a working chamber and a storage chamber each of which contains a supply of gaseous and liquid fluid (which may but need not be sealed from each other), and first and second one-way valves respectively connecting the cylinder chamber with the working chamber and storage chamber to respectively permit flow of liquid fluid into the working chamber and from the storage chamber. The cylinder is provided with first and second openings which respectively connect the cylinder chamber with the working chamber and with the storage chamber, and the plunger normally seals the second opening.

The first one-way valve admits liquid fluid from the cylinder chamber to the working chamber when the plunger reduces the effective volume of the cylinder chamber by moving nearer to the first opening, and the second one-way valve admits liquid fluid from the storage chamber into the cylinder chamber when the plunger increases the effective volume of the cylinder chamber. The working chamber will communicate with the storage chamber through the two openings and through the cylinder chamber when the plunger unseals the second opening to thereby allow for equalization of pressures in the working chamber and storage chamber, i.e., some liquid fluid then flows back to the storage chamber. When the plunger seals both openings of the cylinder, the distance between the two members must increase sufficiently to allow for unsealing of the first opening whereby the pressure prevailing in the working chamber acts against the end face of the plunger to maintain it in the normal position in which the plunger seals only the second opening.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1 is an axial section through an apparatus which embodies one form of the present invention and wherein the working chamber and the storage chamber surround the cylinder;

FIG. 2 is an enlarged sectional view of a detail of the structure shown in FIG. 1;

FIG. 3 is an axial section of a modified apparatus wherein the working chamber is provided in a shell which is connected to one end of the plunger; and FIG. 4 is a fragmentary axial section through a third apparatus which constitutes a slight modification of the apparatus shown in FIG. 3.

Referring first to FIG. 1, there is shown a hydropneumatic apparatus which comprises a housing 3 having its lower end sealed by an end wall 4 which carries an eye 1 serving as a means for articulately connecting the housing with the wheel axle of an automotive vehicle. The upper end of the housing 3 carries an annular wall or cover 5 which accommodates an annular sealing element 6 for a reciprocable plunger 7. The upper end of the plunger 7 carries a second eye 2 which may be connected to the body or chassis of the automotive vehicle. The plunger 7 is reciprocable in a cylinder 8 which extends from the cover 5 toward but short of the lower end wall 4. The cylinder chamber 9 in the interior of the cylinder 8 can be said to include the space between the end wall 4 and the lower end of the cylinder. This cylinder chamber 9 is sealed by a valve plate or carrier 10 which surrounds the lower end portion of the cylinder 8. The working chamber 11 of the apparatus extends between the valve plate 10 and an annular partition 25 which surrounds a median portion of the cylinder 8. A flexible diaphragm or wall 13 whose ends are anchored in the valve plate 10 and partition 25 divides the working chamber 11 into compartments 11a, 11b which are respectively filled with gas and oil or another suitable liquid. A second flexible diaphragm or wall 17 separates the compartments 16a, 16b of a storage chamber or reservoir 16 which extends between the partition 25 and cover 5. The compartments 16a, 16b are respectively filled with gas and liquid, and it will be noted that the bodies of gas filling the compartments 11a, 16a are permanently entrapped therein.

The valve plate 10 carries a first one-way valve or check valve 12 which allows liquid to flow from the cylinder chamber 9 into the compartment 11b but not in the opposite direction. A second one-way valve 21 which is also provided in the valve plate 10 serves to permit flow of liquid from an axially extending channel or groove 20 machined into the periphery of the cylinder 8 and extending from the compartment 16b to the cylinder chamber 9. A second axially extending peripheral groove or channel 24 of the cylinder 8 communicates with the compartment 11b and with a throttling orifice 23 leading into the chamber 9 of the cylinder 8. A second throttling orifice 22 can connect the chamber 9 of the cylinder 8 with the channel 20 and hence with the compartment 16b. When in normal position, the lower end of the plunger 7 is located between the orifices 22 and 23 so that the orifice 23 is free to allow for flow of liquid between the compartment 11b and the chamber 9 via channel 24. When the plunger 7 is moved upwardly and beyond the position shown in FIG. 1, its lower end exposes the orifice 22, thus allowing for equalization of pressures in the chambers 11, 16 through the orifice 22, the chamber 9 of the cylinder 8, orifice 23, and channel 24. Of course, and when the plunger 7 exposes the orifice 22, the compartment 16b is also free to communicate directly with the chamber 9. The channels 24 and 20 respectively form with the orifices 23 and 22 two openings or passages which connect the chamber 9 with the chambers 11 and 16.

The plunger 7 is formed with one or more circumferential grooves for a corresponding number of sealing rings 26.

The arresting means for limiting the upward stroke of the plunger 7 comprises a detent structure including a spherical element 28, best shown in FIG. 2, which is biased by a helical expansion spring 29 accommodated in an inclined bore 27 provided at the upper end of the cylinder 8. The plunger 7 is formed with a circumferential groove 30 whose axial ends are bounded by conical faces 31, 32 whereby the inclination of the face 31 equals the inclination of the bore 27 for the spring 29. This insures that the plunger 7 cannot develop forces which would hinder the element 28 from entering the groove 30. When the plunger 7 moves downwardly, the conical face 32 depresses the element 28 against the bias of the spring 29. FIG. 1 shows that the apparatus may comprise a plurality of detent structures.

The apparatus comprises a tubular distancing element or sleeve 33 which extends between the valve plate 10 and partition 25. The cylinder 8 is sealingly telescoped into the sleeve 33 so that the latter forms the outer boundary for the channels 20 and 24. The valve plate 10 may but need not be provided with a throttling duct 36 which allows for limited communication between the chamber 9 and compartment 11b.

It is now assumed that the lower end portion of the plunger 7 extends downwardly and beyond the lower throttling orifice 23 so that the storage chamber 16 is completely sealed from the cylinder chamber 9 and working chamber 11 because the one-way valves 12 and 21 are closed. If the chassis thereupon rises above and away from the axle of the vehicle, the distance between the eyes 1 and 2 increases so that the plunger 7 exposes the lower orifice 23. The effective volume of the chamber 9 increases because the volume of the unobstructed portion of the bore in the cylinder 8 increases as the plunger 7 moves upwardly so that pressure prevailing in the cylinder chamber 9 decreases and the one-way valve 21 opens to admit liquid from the compartment 16b via channel 20. When the plunger 7 thereupon moves downwardly, the valve 21 closes in a fully automatic way and the valve 12 opens to admit liquid from the chamber 9 into the compartment 11b. Thus, pressure prevailing in the storage chamber 16 decreases when the plunger 7 performs an upward stroke, and pressure prevailing in the working chamber 11 increases when the plunger performs a downward stroke. Pressure prevailing in the chamber 9 suffices to bring the plunger 7 to a normal position in which the plunger exposes the lower orifice 23.

The port 36 will be provided when the pumping action of the apparatus should not be fully effective. This port throttles the flow of liquid between the chamber 9 and compartment 11b whereby the pumping action decreases accordingly.

When the chassis of the vehicle oscillates at a normal amplitude, the chamber 9 remains in continuous communication with the compartment 11b through the opening including the orifice 23 and channel 24. Consequently, the pressure of gas entrapped in the compartment 11a is felt by the liquid which fills the compartment 11b and chamber 9 and is communicated to the lower end face of the plunger 7. Thus, in such normal amplitude range, the spring force of the apparatus is proportional to gas pressure in the compartment 11a. The damping or throttling action is determined by the size of the orifice 23 and increases with increasing difference between the pressures prevailing in the chambers 11 and 16. In other words, the damping action depends on the magnitude of the load upon the plunger 7. An analogous effect can be produced when the plunger moves inwardly by proper dimensioning of the passage defined by the one-way valve 12 and by providing a spring-biased force-limiting valve (not shown) which is installed in the plate 10 between the chamber 9 and compartment 11b.

If the plunger 7 rises to a level in which it exposes the orifice 22, liquid can flow from the compartment 11b via channel 24, orifice 23, the interior of the cylinder 8 and channel 20 to enter the compartment 16b. Depending on the load upon the plunger 7, the latter moves again toward the valve plate 10 so as to seal the orifice 22.

The channels 22, 24 are preferably located diametrically opposite each other.

If the apparatus of FIG. 1 is to operate solely as a pump for maintaining the eyes 1 and 2 at an average distance from each other, i.e., if the apparatus need not act as a shock absorber, the cross sectional areas of the orifice 23, of the passage which is normally sealed by the valve 12 and of the passage which is normally sealed by the valve 21 will be enlarged so that such orifice and such passages will perform no throttling action. In other words, the apparatus will then merely pump liquid into the chambers 9 and 11 but will not absorb shocks. Such construction can be used as auxiliary equipment on vehicles which are already provided with conventional metallic or elastomer shock absorbers and will perform the sole function of maintaining the chassis at a preselected level.

The plunger 7 replaces the piston and piston rod used in certain presently known hydropneumatic shock absorbers. This plunger cooperates directly with the cylinder 8 by being reciprocable in the chamber 9 to thereby regulate the flow of liquid fluid through openings provided in the cylinder wall. In other words, the improved apparatus need not be equipped with special attachments for the plunger because the latter by itself regulates the flow of liquid fluid between the chambers 9, 11 and 16. This pumping action of the plunger is very rapid and depends on the length of strokes which the plunger performs in response to movement of the eye 1 with reference to the eye 2 or vice versa.

When the plunger 7 reciprocates while sealing the orifices 22 and 23, practically the entire energy produced by the oscillating vehicle is used for pumping work. In the normal oscillating range and when the plunger 7 exposes the orifice 22, the energy produced by the oscillating vehicle can be converted in heat energy and the apparatus carries out a desirable cushioning action. As the difference between the pressures prevailing in the chambers 11 and 16 increases, the damping action varies in dependency on the load.

Since the plunger 7 need not be provided with any projecting portions, its surface can be ground and otherwise treated in automatic machines at a low cost.

The compartments 11b and 16b which contain oil or another suitable liquid are preferably immediately adjacent to the housing 3 to bring about highly satisfactory exchange of heat.

FIG. 3 illustrates a modified apparatus wherein the working chamber 11' is located at the closed end of a casing or shell 38' adjacent to the end wall 38a'. The reference numerals used in FIG. 3 are similar to those shown in FIG. 1 but each thereof is followed by a prime. The plunger 7' is hollow and its upper end portion which extends from and beyond the cylinder 8 is formed as a disk 7a' which is rigid with the shell 38' and is also connected with the diaphragm 13'. The latter resembles a cup and divides the working chamber 11' into compartments 11a', 11b' which are respectively filled with gas and liquid.

The storage chamber or reservoir 16' extends between the annular wall 5' and a valve plate 10' adjacent to the end wall 4' of the housing 3'. A diaphragm 17' whose ends are anchored in the valve plate 10' and annular wall 5' divides the storage chamber 16' into compartments 16a', 16b' which are respectively filled with gas and liquid. The valve plate 10' carries the one-way valve 21' which can permit flow of liquid from the compartment 16b' into the cylinder chamber 9' but not in the opposite direction. The one-way valve 12' is provided in the end wall 7b' of the plunger 7' and this end wall 7b' is also formed with a throttling port 36'. The bore 35' of the plunger 7' is in permanent communication with and constitutes an extension of the compartment 11b' and can receive liquid from the chamber 9' when the valve 12' opens.

The lower end portion of the plunger 7' is formed with a circumferential groove 34' which communicates with throttling orifices 23' connecting this groove with the bore 35'. Annular sealing rings 26' are disposed at both axial ends of the groove 34' to seal it from the chamber 9' in the cylinder 8'. The cylinder 8' is provided with an axially extending channel 24' which allows for direct communication between the compartment 11b' and the chamber 9' when the plunger 7' assumes a position within the normal operating range. Such direct connection is established through the opening including the bore 35', orifices 23', groove 34' and channel 24'. The throttling orifice 22' connects directly to the compartment 16b' and is exposed when the plunger 7' rises above the level shown in FIG. 3. This orifice 22' constitutes an opening which connects the storage chamber 16' with the cylinder chamber 9'.

The operation of the apparatus shown in FIG. 3 is clearly analogous to that of the apparatus shown in FIG. 1. The throttling port 36' also performs the same function as the port 36 of FIG. 1. The arresting means for limiting outward movement of the plunger 7' comprises an outwardly extending annular projection or flange 37' on the end wall 5' and an inwardly extending annular projection or flange 39' at the open lower end of the shell 38'. The annular zone 38b' between the projections or flanges 37', 39' preferably accommodates an elastic cushion 38c' which enables these flanges to take up considerable dynamic stresses.

Referring finally to FIG. 4, there is shown an apparatus which is constructed and assembled with a view to reduce its length to a minimum. The working chamber 11" extends all the way from the end wall 41" of the shell 38" to the open end of this shell. Also, the bottom wall 41" is integral with one end of a hollow plunger 7" having a bore 35" which can communicate with the cylinder chamber 9' and storage chamber 16' (not shown in FIG. 4) in the same way as described in connection with FIG. 3. The compartment 11b" of the working chamber 11" is permanently connected with the bor 35" by a duct 40" machined into the bottom wall 41". If the diaphragm 13" is omitted so that the compartments 11a", 11b" are not separated from each other, the apparatus of FIG. 4 must be equipped with a pipe (not shown) which connects to the duct 40" and dips into the supply of liquid in the lower zone of the chamber 11". The numeral 43" denotes a tubular separator which constitutes the internal wall of the chamber 11" and extends between the end wall 41" and the projection or flange 39" at the open end of the shell 38". The housing 3" and the cylinder therein are constructed in the same way as the housing 3' and cylinder 8' of FIG. 3.

The diaphragms 13, 17 of FIG. 1 and the corresponding diaphragms in FIGS. 3 and 4 constitute an optional feature of our apparatus. Thus, and refering to FIG. 1, if the diaphragms 13, 17 are omitted, the gas will simply accumulate in the upper zones of the chambers 11, 16 and will be compressed to the extent determined by the amount of liquid in the respective chamber. It is also possible to reverse the position of the chambers 11 and 16 provided, of course, that the various valves, channels and orifices are rearranged accordingly. If desired, the apparatus may further comprise a safety valve in the form of a pressure relief valve which is then installed between the working chamber 11, 11' or 11" and the respective storage chamber.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A structure of the character described particularly for use as a shock absorber in automotive vehicles, comprising a cylinder and a plunger each connectable to one of two members which are movable toward and away from each other, said cylinder having a cylinder chamber and said plunger being reciprocable in said chamber; a working chamber and a storage chamber each containing a supply of gaseous and liquid fluid; first and second one-way valve means respectively connecting said cylinder chamber with said working chamber and said storage chamber to respectively permit flow of liquid fluid into said working chamber and from said storage chamber, said cylinder having first and second openings respectively connecting said cylinder chamber with said working chamber and said storage chamber and said plunger normally sealing said second opening.

2. A structure as set forth in claim 1, wherein said first and second openings respectively comprise first and second channels provided in said cylinder and respectively communicating with said working chamber and said storage chamber, and throttling orifices connecting each of said channels with said cylinder chamber, the orifice connecting said second channel with said cylinder chamber being normally sealed by said plunger.

3. A structure as set forth in claim 1, wherein said first one-way valve means admits liquid fluid to said working chamber when said plunger reduces the effective volume of said cylinder chamber and said second one-way valve means admits liquid fluid to said cylinder chamber when the plunger increases the effective volume of said cylinder chamber.

4. A structure as set forth in claim 3, wherein said storage chamber communicates with said working chamber through said openings and via said cylinder chamber when said plunger unseals said second opening to allow for equalization of pressures in said working chamber and said storage chamber.

5. A structure as set forth in claim 1, wherein said plunger is provided with at least one sealing ring engaging the internal surface of said cylinder.

6. A structure as set forth in claim 1, wherein each of said openings comprises a channel provided in the periphery of said cylinder and further comprising a sleeve telescopically receiving said cylinder and constituting the outer boundary for said channels.

7. A structure as set forth in claim 1, further comprising arresting means for limiting the stroke of said plunger in a direction to enlarge the effective volume of said cylinder chamber.

8. A structure as set forth in claim 7, wherein said arresting means comprises a detent device including a spring-biased element received in a bore provided in said cylinder and extendable into a complementary groove provided in said plunger.

9. A structure as set forth in claim 1, further comprising at least one throttling port providing a permanent passage between said cylinder chamber and said working chamber.

10. A structure as set forth in claim 1, further comprising pressure relief valve means provided between said working chamber and said cylinder chamber.

11. A structure as set forth in claim 1, wherein said plunger is provided with an axial bore in permanent communication with said working chamber.

12. A structure as set forth in claim 11, wherein one end of said plunger extends from and beyond said cylinder and said working chamber is adjacent to said one end of the plunger.

13. A structure as set forth in claim 11, further comprising a shell surrounding and connected with said plunger externally of said cylinder, said working chamber being provided in and extending substantially along the full length of said shell.

14. A structure as set forth in claim 1, further comprising a shell connected with said plunger externally of said cylinder and arresting means for limiting the stroke of said plunger in a direction to increase the effective volume of said cylinder chamber, said arresting means comprising an outwardly extending projection provided on said cylinder in the interior of said shell and a second projection provided on said shell and extending into the path of said first named projection.

15. A structure as set forth in claim 14, wherein said cylinder comprises an end wall which is rigid with said first named projection and said shell has an open end through which said cylinder extends, said second projection being provided at the open end of said shell.

16. A structure as set forth in claim 1, wherein said openings and said valve means are arranged to cushion the movements of said plunger in dependency on the extent of such movements.

17. A structure as set forth in claim 1, wherein said openings and said valve means are arranged to cushion the movements of said plunger in dependency on the load upon the plunger.

18. A structure as set forth in claim 1, further comprising a carrier provided between said cylinder chamber and said working chamber, said valve means being provided in said carrier.

19. A structure as set forth in claim 1, wherein one of said valve means is carried by said plunger and wherein said plunger is provided with a bore in permanent communication with a chamber other than said cylinder chamber.

20. A structure as set forth in claim 1, further comprising diaphragm means for separating gaseous and liquid fluids in working chamber and said storage chamber.

References Cited

UNITED STATES PATENTS

| 3,033,556 | 5/1962 | Wossner | 267—64 |
| 3,094,317 | 6/1963 | Axthammer | 267—64 |

ARTHUR L. LA POINT, *Primary Examiner.*

R. M. WOHLFARTH, *Assistant Examiner.*